C. S. Brown,
Drag Saw.
Nº 35,058.   Patented Apr. 22, 1862.
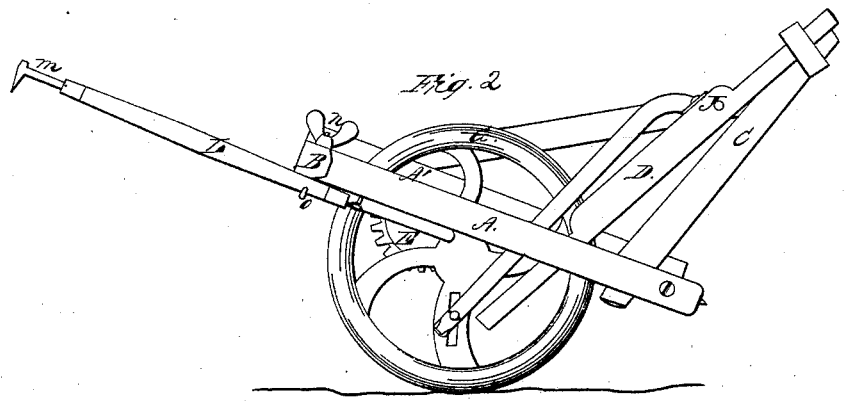
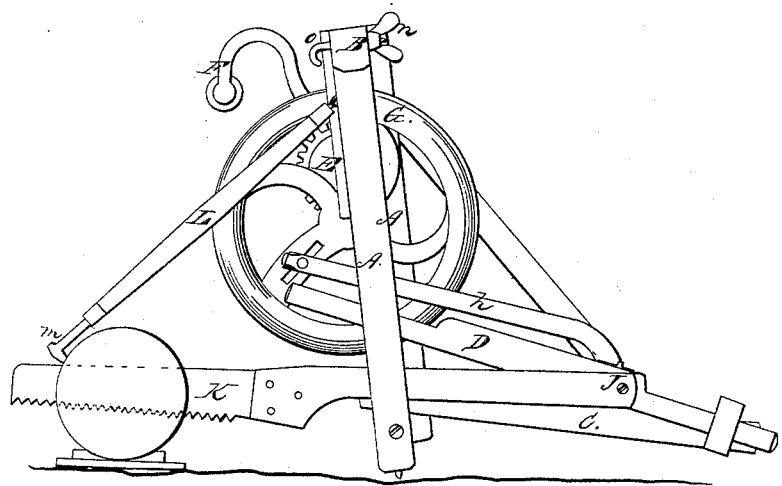
Witnesses
L. B. Mallette
David C. Johnson
Inventor.
C. S. Brown,
by J. Fraser, Atty

UNITED STATES PATENT OFFICE.

CHARLES S. BROWN, OF HOMER, NEW YORK, ASSIGNOR TO HIMSELF AND JOHN H. KENNEDY, OF SAME PLACE.

IMPROVED PORTABLE SAWING-MACHINE.

Specification forming part of Letters Patent No. 35,058, dated April 22, 1862.

*To all whom it may concern:*

Be it known that I, CHARLES S. BROWN, of Homer, in the county of Cortland and State of New York, have invented a new and Improved Portable Sawing-Machine; and I do hereby declare that the following is a full and exact description thereof, reference being had to the accompanying drawings, making part of this specification, in which—

Figure 1 is a side elevation, representing the position of the machine while in operation. Fig. 2 represents it with the saw removed and arranged for transition from place to place.

Like letters designate corresponding parts in both of the figures.

It is the object of my invention to produce a machine which may be operated by one person and accomplish the work of crosscut-sawing in a more expeditious manner than is usually done by hand-sawyers, while at the same time it is so portable as to be readily moved from tree to tree.

I construct a quadrangular frame having three uprights, A, and a transverse piece, B, at the top and bottom. This forms the upright part of the machine, and to the middle post, A', an arm, C, is rigidly framed, extending outward and inclining downward slightly. It is strongly braced and secured to the main or upright frame and forms one of the guides and supports in which the saw-gate D works, its other guide being between the posts A A.

A gear-wheel, E, which is turned by the hand-crank F, drives the fly-wheel G by a pinion on its shaft, and by means of a connecting-rod, $h$, between the wheel and saw-gate a reciprocating motion is imparted to the latter. The saw K is connected with the reciprocating gate by a pivot, $j$, through its stock at a point between the two bearings of the gate, leaving the saw at liberty to be moved up or to descend by its own weight.

On the opposite side from the arm C of the upright parts two rods, L, are connected with the posts A A by staples, which leave them free to be swung in any direction. In the loose end of each a dog, $m$, is fixed for the purpose of driving into the log or timber to be sawed, as shown in Fig. 1. The lower ends of the posts A are provided with spikes, which enter the ground far enough to prevent their sliding. In putting the machine to work it is placed near to the side of the log, so that the upright frame shall be inclined toward it from the perpendicular, when the arms L are placed on the opposite side and their dogs driven in firmly. This fixes the machines very strongly to the log, and, the position of the frame and the dog-arms being both such as to brace against the log, (the chief object of resistance,) vibration and unsteadiness are prevented when the saw is at work. The machine being fixed in this position, it is only necessary to rest the saw on the top of the log and apply motion to the hand-crank F. The weight of the saw feeds it as fast as it is desirable to cut and the speed got up by the gearing makes the work rapid and easy.

In order to move it from place to place the saw is taken off from the pivot $j$ and the arms L L are raised to a position perpendicular to the posts A A, where they are held by tightening the thumb-screw $n$ of the clamping-hooks $o$, as shown in Fig. 2, when the machine is turned down, so as to elevate the arm C and place those containing the dogs L L in a convenient position to be grasped by the hands of the operator. The machine then rests wholly on the fly-wheel G and may be trundled on it like a wheelbarrow from place to place with the greatest ease. The detached saw may be laid across the frame at the same time and ride in safety.

The whole arrangement is compact and light, and forms an effective sawing-machine, which may, with the assistance of one man, be taken into the forest and made to accomplish the hand labor of four or six persons.

What I claim as my invention, and desire to secure by Letters Patent, is—

1. The combination and arrangement of the frame A A, gate D, dog-arms L, fly-wheel and crank G F, and saw K, substantially in the manner and for the purpose shown and described.

2. In combination with the described machine, the clamp-hooks $o$ or equivalent device for holding the dog-arms L L rigidly to the frame A A, to serve as levers for trundling the machine on the fly-wheel G, substantially as set forth.

In witness whereof I have hereunto signed my name in the presence of two subscribing witnesses.

CHARLES S. BROWN.

Witnesses:
 J. FRASER,
 D. C. JOHNSON.